US012782565B2

(12) United States Patent
Matthews et al.

(10) Patent No.: US 12,782,565 B2

(45) Date of Patent: Nov. 3, 2026

(54) COUPLED LASERS FOR COHERENT DISTANCE AND VELOCITY MEASUREMENTS

(71) Applicant: Waymo LLC, Mountain View, CA (US)

(72) Inventors: Michael R. Matthews, Portola Valley, CA (US); Bryce Remesch, Hollis, NH (US); John Lam, Redwood City, CA (US)

(73) Assignee: Waymo LLC, Mountain View, CA (US)

( * ) Notice: Subject to any disclaimer, the term of this patent is extended or adjusted under 35 U.S.C. 154(b) by 1360 days.

(21) Appl. No.: 17/549,088

(22) Filed: Dec. 13, 2021

(65) Prior Publication Data

US 2022/0187468 A1 Jun. 16, 2022

Related U.S. Application Data

(60) Provisional application No. 63/199,207, filed on Dec. 14, 2020.

(51) Int. Cl.
*G01S 17/34* (2020.01)
*B60W 30/08* (2012.01)
(Continued)

(52) U.S. Cl.
CPC ............ *G01S 17/34* (2020.01); *B60W 30/08* (2013.01); *G01S 7/4815* (2013.01); (Continued)

(58) Field of Classification Search
CPC ........ G01S 17/34; G01S 17/931; G01S 17/06; G01S 17/48; G01S 17/58; G01S 17/90; (Continued)

(56) References Cited

U.S. PATENT DOCUMENTS 6,580,497 B1 6/2003 Asaka et al.
10,444,366 B1 10/2019 Stochino
(Continued)

FOREIGN PATENT DOCUMENTS

CN 111999739 A 11/2020
CN 111999769 A 11/2020
EP 3726248 A1 10/2020

OTHER PUBLICATIONS

Stephane Schilt, Renaud Matthey, Daniela Kauffmann-Werner, Christoph Affolderbach, Gaetan Mileti, and Luc ThÃ © venaz, "Laser offset-frequency locking up to 20 GHz using a low-frequency electrical filter technique," Appl. Opt. 47, 4336-4344; 2008 (Year: 2008).*

(Continued)

*Primary Examiner* — Yuqing Xiao
*Assistant Examiner* — Isabelle Lin Boegholm
(74) *Attorney, Agent, or Firm* — Christensen O'Connor Johnson Kindness PLLC

(57) ABSTRACT

The subject matter of this specification can be implemented in, among other things, systems and methods that enable lidar channel multiplexing using optical locking of separate lasers while simultaneously imparting different frequency offsets to beams output by different lasers. As a result, received beams reflected from various objects, which are present in an outside environment, can have Doppler-shifted frequencies that do not overlap, facilitating concurrent identification of distances to and velocities of multiple objects.

19 Claims, 7 Drawing Sheets

(51) Int. Cl.

| | |
|---|---|
| ***B60W 60/00*** | (2020.01) |
| ***G01S 7/481*** | (2006.01) |
| ***G01S 7/4915*** | (2020.01) |
| ***G01S 17/06*** | (2006.01) |
| ***G01S 17/48*** | (2006.01) |
| ***G01S 17/58*** | (2006.01) |
| ***G01S 17/90*** | (2020.01) |
| ***G01S 17/931*** | (2020.01) |

(52) U.S. Cl.
CPC ............ *G01S 7/4915* (2013.01); *G01S 17/06* (2013.01); *G01S 17/48* (2013.01); *G01S 17/58* (2013.01); *G01S 17/931* (2020.01); *B60W 60/0027* (2020.02); *B60W 2420/403* (2013.01); *B60W 2420/408* (2024.01); *G01S 17/90* (2020.01)

(58) Field of Classification Search
CPC .... G01S 7/4815; G01S 7/4915; B60W 30/08; B60W 60/0027; B60W 2420/408; B60W 2420/403
See application file for complete search history.

(56) References Cited

U.S. PATENT DOCUMENTS

| | | | | |
|---|---|---|---|---|
| 2007/0058157 | A1 | 3/2007 | Deines | |
| 2009/0245306 | A1* | 10/2009 | Rakuljic | H01S 5/4006 372/32 |
| 2011/0292371 | A1 | 12/2011 | Chang | |
| 2012/0016615 | A1 | 1/2012 | Carpaij et al. | |
| 2013/0044309 | A1 | 2/2013 | Dakin et al. | |
| 2018/0210068 | A1* | 7/2018 | Efimov | H04B 10/60 |
| 2019/0049312 | A1* | 2/2019 | Strandjord | G01B 11/14 |
| 2019/0361122 | A1* | 11/2019 | Crouch | G01S 7/487 |
| 2020/0011994 | A1* | 1/2020 | Thorpe | G01S 17/34 |
| 2020/0132850 | A1* | 4/2020 | Crouch | G01S 7/4817 |
| 2020/0166617 | A1* | 5/2020 | Crouch | G01S 7/493 |
| 2020/0386886 | A1 | 12/2020 | Sebastian et al. | |
| 2021/0096228 | A1* | 4/2021 | Behzadi | G01S 7/4815 |
| 2021/0405201 | A1 | 12/2021 | Wagner et al. | |
| 2022/0050187 | A1* | 2/2022 | Yao | G01S 7/4865 |

OTHER PUBLICATIONS

Trivikramarao Gavara, Takeru Ohashi, Yusuke Sasaki, Takuya Kawashima, Hiroaki Hamano, Ryo Yoshizaki, Yuki Fujimura, Kazumichi Yoshii, Chiaki Ohae, and Masayuki Katsuragawa, "Dual-frequency injection-locked continuous-wave near-infrared laser," Opt. Lett. 41, 2994-2997 (Year: 2016).*

Stephane Schilt, Renaud Matthey, Daniela Kauffmann-Werner, Christoph Affolderbach, Gaetano Mileti, and Luc ThÃ © venaz, "Laser offset-frequency locking up to 20 GHz using a low-frequency electrical filter technique," Appl. Opt. 47, 4336-4344 (Year: 2008).*

International Search Report and Written Opinion for International Application No. PCT/US2021/063398, mailed Apr. 7, 2022, 9 Pages.

International Search Report for International application No. PCT/US2021/063393, dated Apr. 7, 2022, 12 pages.

Marino et al., "Phase-locked laser system for use in atomic coherence experiments," Review of Scientific Instruments 79, 013104, Jan. 11, 2008, 8 pages.

"Riemensberger et al., ""Massively parallel coherent laser rangingusing a soliton microcomb,"" Nature, vol. 581, May 4, 2020, 17 pages."

* cited by examiner

COUPLED LASERS FOR COHERENT DISTANCE AND VELOCITY MEASUREMENTS

RELATED APPLICATIONS

The instant specification claims the benefit of U.S. Provisional Application No. 63/199,207, filed Dec. 14, 2020, the entire contents of which is being incorporated herein by reference.

TECHNICAL FIELD

The instant specification generally relates to range and velocity sensing in applications that involve determining locations and velocities of moving objects. More specifically, the instant specification relates to increasing a number of sensing channels using optical locking of separate laser sources.

BACKGROUND

Various automotive, aeronautical, marine, atmospheric, industrial, and other applications that involve tracking locations and motion of objects benefit from optical and radar detection technology. A rangefinder (radar or optical) device operates by emitting a series of signals that travel to an object and then detecting signals reflected back from the object. By determining a time delay between a signal emission and an arrival of the reflected signal, the rangefinder can determine a distance to the object. Additionally, the rangefinder can determine the velocity (the speed and the direction) of the object's motion by emitting two or more signals in a quick succession and detecting a changing position of the object with each additional signal. Coherent rangefinders, which utilize the Doppler effect, can determine a longitudinal (radial) component of the object's velocity by detecting a change in the frequency of the arrived wave from the frequency of the emitted signal. When the object is moving away from (or towards) the rangefinder, the frequency of the arrived signal is lower (higher) than the frequency of the emitted signal, and the change in the frequency is proportional to the radial component of the object's velocity. Autonomous (self-driving) vehicles operate by sensing an outside environment with various electromagnetic (radio, optical, infrared) sensors and charting a driving path through the environment based on the sensed data. Additionally, the driving path can be determined based on positioning (e.g., Global Positioning System (GPS)) and road map data. While the positioning and the road map data can provide information about static aspects of the environment (buildings, street layouts, etc.), dynamic information (such as information about other vehicles, pedestrians, cyclists, etc.) is obtained from contemporaneous electromagnetic sensing data. Precision and safety of the driving path and of the speed regime selected by the autonomous vehicle depend on the quality of the sensing data and on the ability of autonomous driving computing systems to process the sensing data and to provide appropriate instructions to the vehicle controls and the drivetrain.

BRIEF DESCRIPTION OF THE DRAWINGS

The present disclosure is illustrated by way of examples, and not by way of limitation, and can be more fully understood with references to the following detailed description when considered in connection with the figures, in which.

SUMMARY

Figure 1:
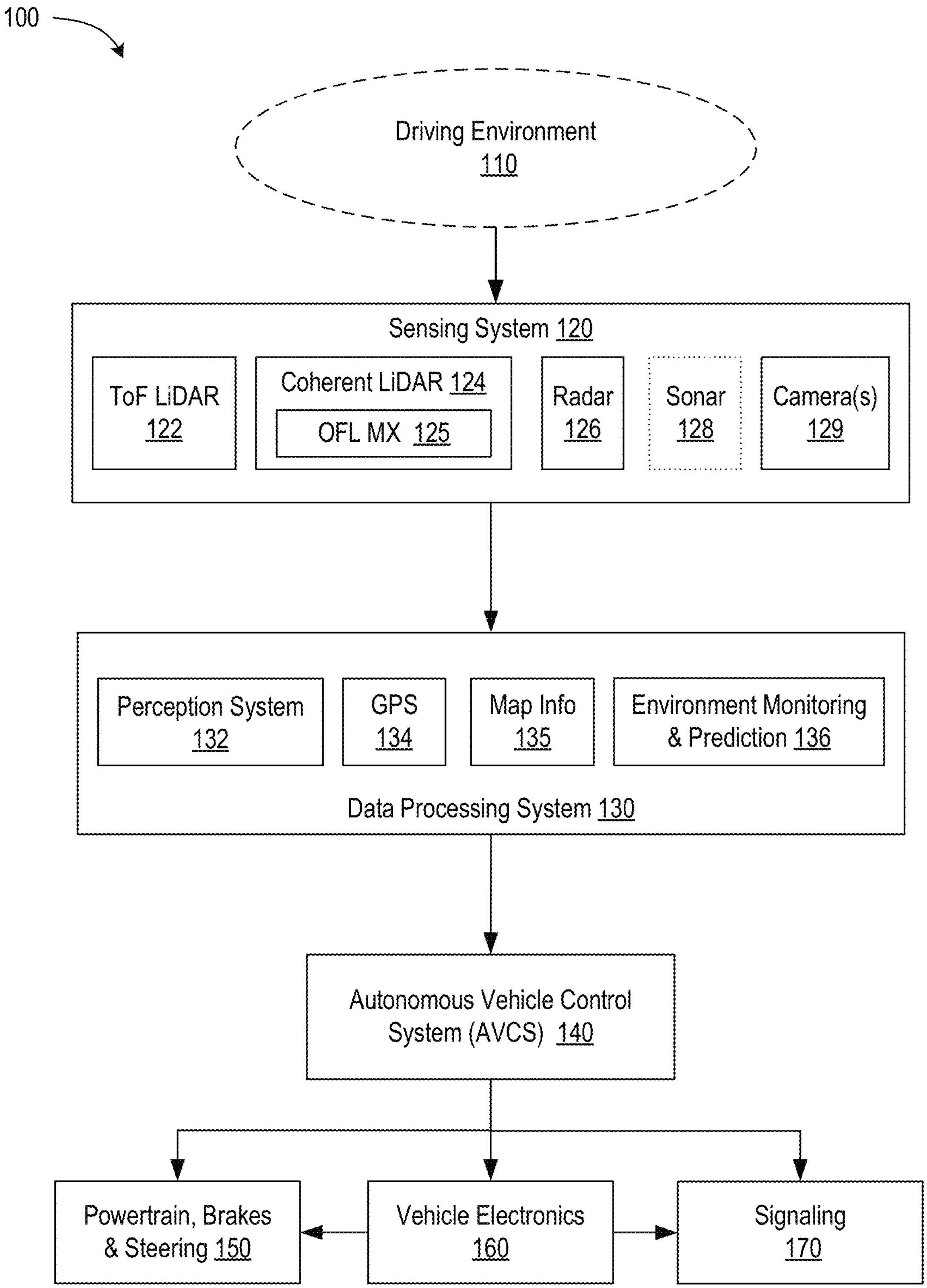
FIG. 1 is a diagram illustrating components of an example autonomous vehicle that can deploy coherent light detection and ranging (lidar) sensors with channel multiplexing using optical locking, in accordance with some implementations of the present disclosure.

In one implementation, disclosed is a system that includes a first light source configured to produce a first beam having a first frequency; a second light source configured to produce a second beam; a first optical feedback loop configured to set a frequency of the second beam to a second frequency, wherein the second frequency is different from the first frequency by a first offset frequency; and an optical detection subsystem configured to: receive a reflected beam produced upon interaction of the second beam with an object in an outside environment, and determine, based on a phase difference between the reflected beam and a copy of the first beam, at least one of a velocity of the object or a distance to the object.

In another implementation, disclosed is a sensing system of an autonomous vehicle (AV), including: a first light source configured to produce a first beam having a first frequency; a second light source configured to produce a second beam; a first optical feedback loop to lock a frequency of the second beam to a second frequency, wherein the second frequency is different from the first frequency by a first offset frequency; a third light source to produce a third beam; a second optical feedback loop to lock a frequency of the third beam to a third frequency, wherein the third frequency is different from the first frequency by a second offset frequency; an optical interface configured to output the second beam and the third beam to a driving environment of the AV; and an optical detection subsystem configured to: receive a first reflected beam, wherein the first reflected beam is produced upon interaction of the second beam with a first object in the driving environment of the AV and is time-delayed and Doppler-shifted relative to the second beam; and determine, based on a first time delay and a first Doppler shift of the first reflected beam relative to the second beam, a velocity of the first object and a distance to the first object.

In another implementation, disclosed is a method that includes producing a first beam having a first frequency; producing a second beam; setting, using a first optical feedback loop, a frequency of the second beam to a second frequency, wherein the second frequency is different from the first frequency by a first offset frequency; receiving a reflected beam produced upon interaction of the second beam with an object in an outside environment; and determining, based on a phase difference between the reflected beam and a copy of the first beam, at least one of a velocity of the object or a distance to the object.

DETAILED DESCRIPTION

An autonomous vehicle (AV) or a driver-operated vehicle that uses various driver-assistance technologies can employ a light detection and ranging (lidar) technology to detect distances to various objects in the environment and, sometimes, the velocities of such objects. A lidar emits one or more laser signals (pulses) that travel to an object and then detects arrived signals reflected from the object. By determining a time delay between the signal emission and the arrival of the reflected waves, a time-of-flight (ToF) lidar can determine the distance to the object. A typical lidar emits signals in multiple directions to obtain a wide view of the outside environment. The outside environment can be any environment including any urban environment (e.g., street, etc.), rural environment, highway environment, indoor environment (e.g., the environment of an industrial plant, a shipping warehouse, a hazardous area of a building, etc.), marine environment, and so on. The outside environment can include multiple stationary objects (roadways, buildings, bridges, road signs, shoreline, rocks, trees, etc.), multiple movable objects (e.g., vehicles, bicyclists, pedestrians, animals, ships, boats, etc.), and/or any other objects located outside the AV. For example, a lidar device can cover (e.g., scan) an entire 360-degree view by collecting a series of consecutive frames identified with timestamps. As a result, each sector in space is sensed in time increments $\Delta\tau$, which are determined by the angular velocity of the lidar's scanning speed. "Frame" or "sensing frame," as used herein, can refer to an entire 360-degree view of the outside environment obtained over a scan of the lidar or, alternatively, to any smaller sector, e.g., a 1-degree, 5-degree, a 10-degree, or any other angle obtained over a fraction of the scan cycle (revolution), or over a scan designed to cover a limited angle.

ToF lidars can also be used to determine velocities of objects in the outside environment, e.g., by detecting two (or more) locations $\vec{r}(t_1)$, $\vec{r}(t_2)$ of some reference point of an object (e.g., the front end of a vehicle) and inferring the velocity as the ratio, $\vec{v}=[\vec{r}(t_2)-\vec{r}(t_1)]/[t_2-t_1]$. By design, the measured velocity $\vec{v}$ is not the instantaneous velocity of the object but rather the velocity averaged over the time interval $t_2-t_1$, as the ToF technology does not allow to ascertain whether the object maintained the same velocity $\vec{v}$ during this time or experienced an acceleration or deceleration (with detection of acceleration/deceleration requiring additional locations $\vec{r}(t_3)$, $\vec{r}(t_4)$ . . . of the object).

Coherent lidars operate by detecting, in addition to ToF, a change in the frequency of the reflected signal—the Doppler shift—indicative of the velocity of the reflecting surface. Measurements of the Doppler shift can be used to determine, based on a single sensing frame, radial components (along the line of beam propagation) of the velocities of various reflecting points belonging to one or more objects in the outside environment. A signal emitted by a coherent lidar can be modulated (in frequency and/or phase) with a radio frequency (RF) signal prior to being transmitted to a target. A local copy (referred to as a local oscillator (LO) herein) of the transmitted signal can be maintained on the lidar and mixed with a signal reflected from the target; a beating pattern between the two signals can be extracted and Fourier-analyzed to determine the Doppler shift and identify the radial velocity of the target. A frequency-modulated continuous-wave (FMCW) lidar can be used to determine the target's velocity and distance to the lidar using a single beam. The FMCW lidar uses beams that are modulated (in frequency and/or phase) with radio frequency (RF) signals prior to being transmitted to a target. RF modulation can be sufficiently complex and detailed to allow detection, based on the relative shift (caused by the time-of-flight delays) of RF modulation of the LO copy and RF modulation of the reflected beam.

Increasing frequency and efficiency of lidar scanning can be beneficial in applications of the lidar technology, such as autonomous vehicles. Simultaneously producing multiple beams (sensing channels) can reduce the time needed to obtain a full sensing frame of the outside environment. To prevent interference ("cross-talk") between different channels, a lidar device can use optical modulators that impart different frequency offsets as well as different phase or frequency signatures to different output beams. Outfitting lidars with multiple modulators (such as acousto-optic or electro-optic modulators), however, increases complexity, size, and costs of producing and maintaining the lidar devices.

Aspects and implementations of the present disclosure enable systems and methods of coherent channel multiplexing using optical locking of separate lasers while simultaneously imparting different frequency offsets to beams transmitted along different directions. As a result, received reflected beams can have Doppler-shifted frequencies that do not overlap and, therefore, enable concurrent processing by analog and digital circuitry (such as spectral, e.g., Fourier, analyzers) for identification of ranges and velocities of multiple objects (or multiple reflecting points of the same object). Such channel multiplexing is amenable to scaling (e.g., in the form of multi-laser cascade systems) without the need to have separate optical modulation devices (e.g., acousto-optic or electro-optic modulators) for each sensing channel. The advantages of the disclosed implementations include, but are not limited to, improving speed, coverage, and efficiency of velocity and distance detections as well as reducing the complexity and manufacturing costs of lidar devices.

FIG. 1 is a diagram illustrating components of an example autonomous vehicle (AV) 100 that can deploy a lidar device capable of signal multiplexing for improved efficiency, accuracy, and speed of target characterization, in accordance with some implementations of the present disclosure. Autonomous vehicles can include motor vehicles (cars, trucks, buses, motorcycles, all-terrain vehicles, recreational vehicle, any specialized farming or construction vehicles, and the like), aircraft (planes, helicopters, drones, and the like), naval vehicles (ships, boats, yachts, submarines, and the like), or any other self-propelled vehicles (e.g., robots, factory or warehouse robotic vehicles, sidewalk delivery robotic vehicles, etc.) capable of being operated in a self-driving mode (without a human input or with a reduced human input).

Vehicles, such as those described herein, may be configured to operate in one or more different driving modes. For instance, in a manual driving mode, a driver may directly control acceleration, deceleration, and steering via inputs such as an accelerator pedal, a brake pedal, a steering wheel, etc. A vehicle may also operate in one or more autonomous driving modes including, for example, a semi or partially autonomous driving mode in which a person exercises some amount of direct or remote control over driving operations, or a fully autonomous driving mode in which the vehicle handles the driving operations without direct or remote control by a person. These vehicles may be known by different names including, for example, autonomously driven vehicles, self-driving vehicles, and so on.

As described herein, in a semi or partially autonomous driving mode, even though the vehicle assists with one or more driving operations (e.g., steering, braking and/or accelerating to perform lane centering, adaptive cruise control, advanced driver assistance systems (ADAS), or emergency braking), the human driver is expected to be situationally aware of the vehicle's surroundings and supervise the assisted driving operations. Here, even though the vehicle may perform all driving tasks in certain situations, the human driver is expected to be responsible for taking control as needed.

Although, for brevity and conciseness, various systems and methods are described below in conjunction with autonomous vehicles, similar techniques can be used in various driver assistance systems that do not rise to the level of fully autonomous driving systems. In the United States, the Society of Automotive Engineers (SAE) have defined different levels of automated driving operations to indicate how much, or how little, a vehicle controls the driving, although different organizations, in the United States or in other countries, may categorize the levels differently. More specifically, disclosed systems and methods can be used in SAE Level 2 driver assistance systems that implement steering, braking, acceleration, lane centering, adaptive cruise control, etc., as well as other driver support. The disclosed systems and methods can be used in SAE Level 3 driving assistance systems capable of autonomous driving under limited (e.g., highway) conditions. Likewise, the disclosed systems and methods can be used in vehicles that use SAE Level 4 self-driving systems that operate autonomously under most regular driving situations and require only occasional attention of the human operator. In all such driving assistance systems, accurate lane estimation can be performed automatically without a driver input or control (e.g., while the vehicle is in motion) and result in improved reliability of vehicle positioning and navigation and the overall safety of autonomous, semi-autonomous, and other driver assistance systems. As previously noted, in addition to the way in which SAE categorizes levels of automated driving operations, other organizations, in the United States or in other countries, may categorize levels of automated driving operations differently. Without limitation, the disclosed systems and methods herein can be used in driving assistance systems defined by these other organizations' levels of automated driving operations.

A driving environment 110 can be or include any portion of the outside environment containing objects that can determine or affect how driving of the AV occurs. More specifically, a driving environment 110 can include any objects (moving or stationary) located outside the AV, such as roadways, buildings, trees, bushes, sidewalks, bridges, mountains, other vehicles, pedestrians, bicyclists, and so on. The driving environment 110 can be urban, suburban, rural, and so on. In some implementations, the driving environment 110 can be an off-road environment (e.g. farming or agricultural land). In some implementations, the driving environment can be inside a structure, such as the environment of an industrial plant, a shipping warehouse, a hazardous area of a building, and so on. In some implementations, the driving environment 110 can consist mostly of objects moving parallel to a surface (e.g., parallel to the surface of Earth). In other implementations, the driving environment can include objects that are capable of moving partially or fully perpendicular to the surface (e.g., balloons, leaves falling, etc.). The term "driving environment" should be understood to include all environments in which motion of self-propelled vehicles can occur. For example, "driving environment" can include any possible flying environment of an aircraft or a marine environment of a naval vessel. The objects of the driving environment 110 can be located at any distance from the AV, from close distances of several feet (or less) to several miles (or more).

The example AV 100 can include a sensing system 120. The sensing system 120 can include various electromagnetic (e.g., optical) and non-electromagnetic (e.g., acoustic) sensing subsystems and/or devices. The terms "optical" and "light," as referenced throughout this disclosure, are to be understood to encompass any electromagnetic radiation (waves) that can be used in object sensing to facilitate autonomous driving, e.g., distance sensing, velocity sensing, acceleration sensing, rotational motion sensing, and so on. For example, "optical" sensing can utilize a range of light visible to a human eye (e.g., the 380 to 700 nm wavelength range), the UV range (below 380 nm), the infrared range (above 700 nm), the radio frequency range (above 1 m), etc. In implementations, "optical" and "light" can include any other suitable range of the electromagnetic spectrum.

The sensing system 120 can include a radar unit 126, which can be any system that utilizes radio or microwave frequency signals to sense objects within the driving environment 110 of the AV 100. Radar unit 126 may deploy a sensing technology that is similar to the lidar technology but uses a radio wave spectrum of the electromagnetic waves. For example, radar unit 126 may use 10-100 GHz carrier radio frequencies. Radar unit 126 may be a pulsed ToF radar, which detects a distance to the objects from the time of signal propagation, or a continuously-operated coherent radar, which detects both the distance to the objects as well as the velocities of the objects, by determining a phase difference between transmitted and reflected radio signals. Compared with lidars, radar sensing units have lower spatial resolution (by virtue of a much longer wavelength), but lack expensive optical elements, are easier to maintain, have a longer working range, and are less sensitive to adverse weather conditions. An AV may often be outfitted with multiple radar transmitters and receivers as part of the radar unit 126. The radar unit 126 can be configured to sense both the spatial locations of the objects (including their spatial dimensions) and their velocities (e.g., using the radar Doppler shift technology). The sensing system 120 can include a ToF lidar sensor 122 (e.g., a lidar rangefinder), which can be a laser-based unit capable of determining distances to the objects in the driving environment 110. The ToF lidar sensor 122 can utilize wavelengths of electromagnetic waves that are shorter than the wavelength of the radio waves and can, therefore, provide a higher spatial resolution and sensitivity compared with the radar unit 126. The sensing system 120 can include a coherent lidar sensor 124, such as a frequency-modulated continuous-wave (FMCW) sensor, phase-modulated lidar sensor, amplitude-modulated lidar sensor, and the like. Coherent lidar sensor 124 can use optical heterodyne detection for velocity determination. In some implementations, the functionality of the ToF lidar sensor 122 and coherent lidar sensor 124 can be combined into a single (e.g., hybrid) unit capable of determining both the distance to and the radial velocity of the reflecting object. Such a hybrid unit can be configured to operate in an incoherent sensing mode (ToF mode) and/or a coherent sensing mode (e.g., a mode that uses heterodyne detection) or both modes at the same time. In some implementations, multiple coherent lidar sensor 124 units can be mounted on an AV, e.g., at different locations separated in space, to provide additional information about a transverse component of the velocity of the reflecting object.

ToF lidar sensor 122 and/or coherent lidar sensor 124 can include one or more laser sources producing and emitting signals and one or more detectors of the signals reflected back from the objects. ToF lidar sensor 122 and/or coherent lidar sensor 124 can include spectral filters to filter out spurious electromagnetic waves having wavelengths (frequencies) that are different from the wavelengths (frequencies) of the emitted signals. In some implementations, ToF lidar sensor 122 and/or coherent lidar sensor 124 can include directional filters (e.g., apertures, diffraction gratings, and so on) to filter out electromagnetic waves that can arrive at the detectors along directions different from the reflection directions for the emitted signals. ToF lidar sensor 122 and/or coherent lidar sensor 124 can use various other optical components (lenses, mirrors, gratings, optical films, interferometers, spectrometers, local oscillators, and the like) to enhance sensing capabilities of the sensors.

In some implementations, ToF lidar sensor 122 and/or coherent lidar sensor 124 can include one or more 360-degree scanning units (which scan the outside environment in a horizontal direction, in one example). In some implementations, ToF lidar sensor 122 and/or coherent lidar sensor 124 can be capable of spatial scanning along both the horizontal and vertical directions. In some implementations, the field of view can be up to 90 degrees in the vertical direction (e.g., with at least a part of the region above the horizon scanned by the lidar signals or with at least part of the region below the horizon scanned by the lidar signals). In some implementations (e.g., in aeronautical environments), the field of view can be a full sphere (consisting of two hemispheres). For brevity and conciseness, when a reference to "lidar technology," "lidar sensing," "lidar data," and "lidar," in general, is made in the present disclosure, such reference shall be understood also to encompass other sensing technology that operate, generally, at the near-infrared wavelength, but can include sensing technology that operate at other wavelengths as well.

Coherent lidar sensor 124 can include an optical feedback loop multiplexing (OFL MX) system 125 capable of generating multiple sensing channels, each channel having a different frequency offset for concurrent sensing along multiple directions in the outside environment, e.g., driving environment 110. OFL MX system 125 can deploy a master light source (e.g., a local oscillator laser) and one or more slave light sources (e.g., signal laser beams), as described in more detail below. Each of the sensing channels can be used by coherent lidar sensor 124 for transmitting a sensing signal and receiving a return signal reflected from a target (e.g., an object in the driving environment 110) to determine radial velocity of the target and/or distance to the target, using optical heterodyne and radio frequency circuitry of coherent lidar sensor 124.

The sensing system 120 can further include one or more cameras 129 to capture images of the driving environment 110. The images can be two-dimensional projections of the driving environment 110 (or parts of the driving environment 110) onto a projecting plane of the cameras (flat or non-flat, e.g. fisheye cameras). Some of the cameras 129 of the sensing system 120 can be video cameras configured to capture a continuous (or quasi-continuous) stream of images of the driving environment 110. Some of the cameras 129 of the sensing system 120 can be high resolution cameras (HRCs) and some of the cameras 129 can be surround view cameras (SVCs). The sensing system 120 can also include one or more sonars 128, which can be ultrasonic sonars, in some implementations.

The sensing data obtained by the sensing system 120 can be processed by a data processing system 130 of AV 100. In some implementations, the data processing system 130 can include a perception system 132. Perception system 132 can be configured to detect and track objects in the driving environment 110 and to recognize/identify the detected objects. For example, the perception system 132 can analyze images captured by the cameras 129 and can be capable of detecting traffic light signals, road signs, roadway layouts (e.g., boundaries of traffic lanes, topologies of intersections, designations of parking places, and so on), presence of obstacles, and the like. The perception system 132 can further receive the lidar sensing data (Doppler data and/or ToF data) to determine distances to various objects in the driving environment 110 and velocities (radial and transverse) of such objects. In some implementations, the perception system 132 can also receive the radar sensing data, which may similarly include distances to various objects as well as velocities of those objects. Radar data can be complementary to lidar data, e.g., whereas lidar data may high-resolution data for low and mid-range distances (e.g., up to several hundred meters), radar data may include lower-resolution data collected from longer distances (e.g., up to several kilometers or more). In some implementations, perception system 132 can use the lidar data and/or radar data in combination with the data captured by the camera(s) 129. In one example, the camera(s) 129 can detect an image of road debris partially obstructing a traffic lane. Using the data from the camera(s) 129, perception system 132 can be capable of determining the angular extent of the debris. Using the lidar data, the perception system 132 can determine the distance from the debris to the AV and, therefore, by combining the distance information with the angular size of the debris, the perception system 132 can determine the linear dimensions of the debris as well.

In another implementation, using the lidar data, the perception system 132 can determine how far a detected object is from the AV and can further determine the component of the object's velocity along the direction of the AV's motion. Furthermore, using a series of quick images obtained by the camera, the perception system 132 can also determine the lateral velocity of the detected object in a direction perpendicular to the direction of the AV's motion. In some implementations, the lateral velocity can be determined from the lidar data alone, for example, by recognizing an edge of the object (using horizontal scanning) and further determining how quickly the edge of the object is moving in the lateral direction. The perception system 132 can receive one or more sensor data frames from the sensing system 120. Each of the sensor frames can include multiple points. Each point can correspond to a reflecting surface from which a signal emitted by the sensing system 120 (e.g., by ToF lidar sensor 122, coherent lidar sensor 124, etc.) is reflected. The type and/or nature of the reflecting surface can be unknown. Each point can be associated with various data, such as a timestamp of the frame, coordinates of the reflecting surface, radial velocity of the reflecting surface, intensity of the reflected signal, and so on.

The perception system 132 can further receive information from a positioning subsystem, which can include a GPS transceiver (not shown), configured to obtain information about the position of the AV relative to Earth and its surroundings. The positioning data processing module 134 can use the positioning data (e.g., GPS and IMU data) in conjunction with the sensing data to help accurately determine the location of the AV with respect to fixed objects of the driving environment 110 (e.g. roadways, lane boundaries, intersections, sidewalks, crosswalks, road signs, curbs, surrounding buildings, etc.) whose locations can be provided by map information 135. In some implementations, the data processing system 130 can receive non-electromagnetic data, such as audio data (e.g., ultrasonic sensor data, or data from a mic picking up emergency vehicle sirens), temperature sensor data, humidity sensor data, pressure sensor data, meteorological data (e.g., wind speed and direction, precipitation data), and the like.

Data processing system 130 can further include an environment monitoring and prediction component 136, which can monitor how the driving environment 110 evolves with time, e.g., by keeping track of the locations and velocities of the moving objects. In some implementations, environment monitoring and prediction component 136 can keep track of the changing appearance of the driving environment due to motion of the AV relative to the driving environment. In some implementations, environment monitoring and prediction component 136 can make predictions about how various moving objects of the driving environment 110 will be positioned within a prediction time horizon. The predictions can be based on the current locations and velocities of the moving objects as well as on the tracked dynamics of the moving objects during a certain (e.g., predetermined) period of time. For example, based on stored data for object 1 indicating accelerated motion of object 1 during the previous 3-second period of time, environment monitoring and prediction component 136 can conclude that object 1 is resuming its motion from a stop sign or a red traffic light signal. Accordingly, environment monitoring and prediction component 136 can predict, given the layout of the roadway and presence of other vehicles, where object 1 is likely to be within the next 3 or 5 seconds of motion. As another example, based on stored data for object 2 indicating decelerated motion of object 2 during the previous 2-second period of time, environment monitoring and prediction component 136 can conclude that object 2 is stopping at a stop sign or at a red traffic light signal. Accordingly, environment monitoring and prediction component 136 can predict where object 2 is likely to be within the next 1 or 3 seconds. Environment monitoring and prediction component 136 can perform periodic checks of the accuracy of its predictions and modify the predictions based on new data obtained from the sensing system 120.

The data generated by the perception system 132, the positioning data processing module 134, and environment monitoring and prediction component 136 can be used by an autonomous driving system, such as AV control system (AVCS) 140. The AVCS 140 can include one or more algorithms that control how AV 100 is to behave in various driving situations and driving environments. For example, the AVCS 140 can include a navigation system for determining a global driving route to a destination point. The AVCS 140 can also include a driving path selection system for selecting a particular path through the immediate driving environment, which can include selecting a traffic lane, negotiating a traffic congestion, choosing a place to make a U-turn, selecting a trajectory for a parking maneuver, and so on. The AVCS 140 can also include an obstacle avoidance system for safe avoidance of various obstructions (rocks, stalled vehicles, a jaywalking pedestrian, and so on) within the driving environment of the AV. The obstacle avoidance system can be configured to evaluate the size, shape, and trajectories of the obstacles (if obstacles are moving) and select an optimal driving strategy (e.g., braking, steering, accelerating, etc.) for avoiding the obstacles.

Algorithms and modules of AVCS 140 can generate instructions for various systems and components of the vehicle, such as the powertrain, brakes, and steering 150, vehicle electronics 160, signaling 170, and other systems and components not explicitly shown in FIG. 1. The powertrain, brakes, and steering 150 can include an engine (internal combustion engine, electric engine, and so on), transmission, differentials, axles, wheels, steering mechanism, and other systems. The vehicle electronics 160 can include an on-board computer, engine management, ignition, communication systems, carputers, telematics, in-car entertainment systems, and other systems and components. The signaling 170 can include high and low headlights, stopping lights, turning and backing lights, horns and alarms, inside lighting system, dashboard notification system, passenger notification system, radio and wireless network transmission systems, and so on. Some of the instructions output by the AVCS 140 can be delivered directly to the powertrain, brakes, and steering 150 (or signaling 170) whereas other instructions output by the AVCS 140 are first delivered to the vehicle electronics 160, which generate commands to the powertrain and steering 150 and/or signaling 170.

In one example, the AVCS 140 can determine that an obstacle identified by the data processing system 130 is to be avoided by decelerating the vehicle until a safe speed is reached, followed by steering the vehicle around the obstacle. The AVCS 140 can output instructions to the powertrain, brakes, and steering 150 (directly or via the vehicle electronics 160) to 1) reduce, by modifying the throttle settings, a flow of fuel to the engine to decrease the engine rpm, 2) downshift, via an automatic transmission, the drivetrain into a lower gear, 3) engage a brake unit to reduce (while acting in concert with the engine and the transmission) the vehicle's speed until a safe speed is reached, and 4) perform, using a power steering mechanism, a steering maneuver until the obstacle is safely bypassed. Subsequently, the AVCS 140 can output instructions to the powertrain, brakes, and steering 150 to resume the previous speed settings of the vehicle.

Figure 2:
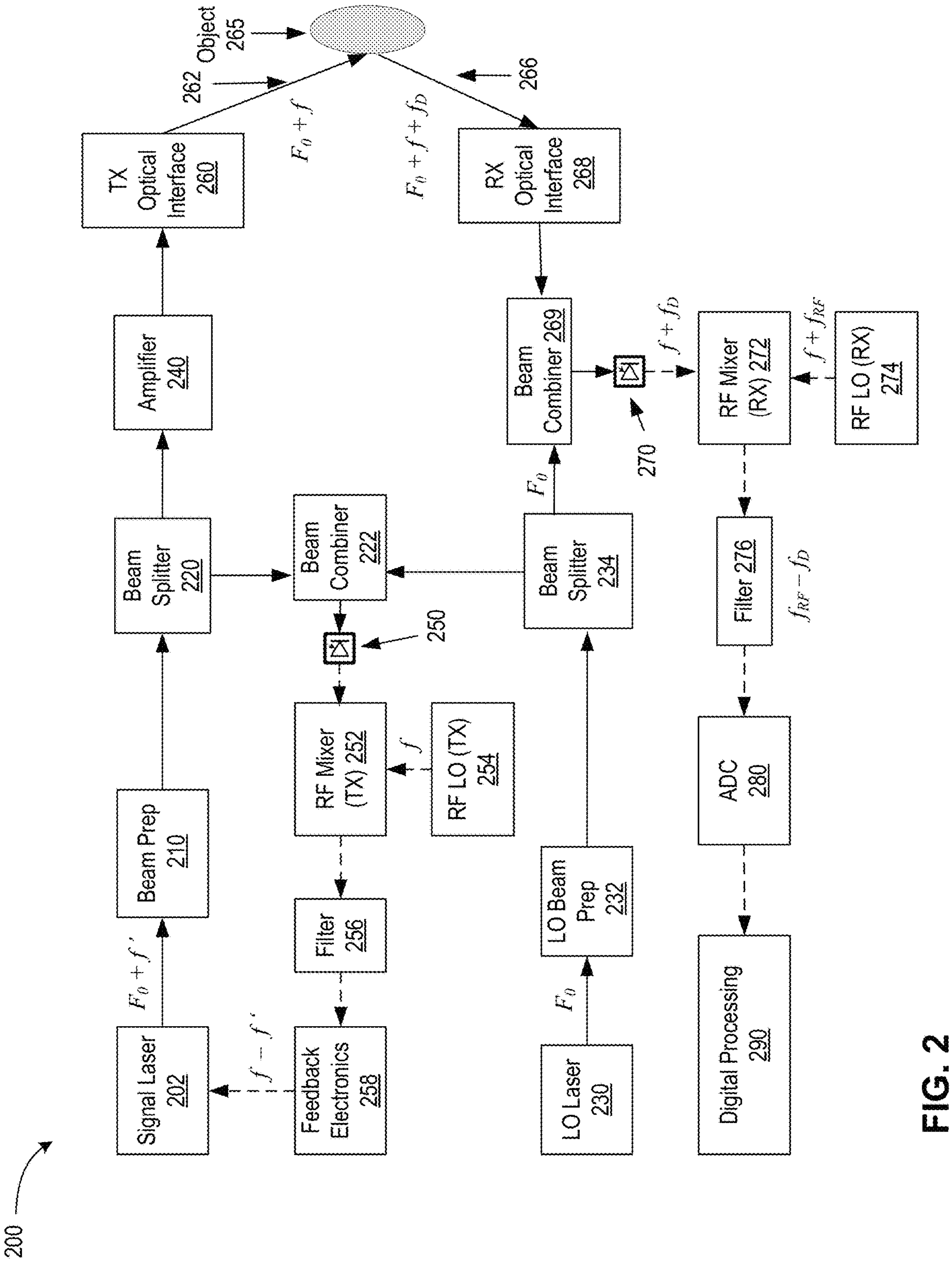
FIG. 2 is a block diagram illustrating an example implementation of an optical sensing system that uses optical locking to enable channel multiplexing for range and velocity detection, in accordance with some aspects of the present disclosure.

FIG. 2 is a block diagram illustrating an example implementation of an optical sensing system 200 (e.g., a part of sensing system 120) that uses optical locking to enable channel multiplexing for range and velocity detection, in accordance with some aspects of the present disclosure. Optical sensing system 200 can be a part of coherent lidar sensor 124 and can implement OFL multiplexing 125. Depicted in FIG. 2 are multiple sources of light, such as a signal laser 202 and a local oscillator (LO) laser 230 configured to produce one or more beams of light. "Beams"

should be understood herein as referring to any signals of electromagnetic radiation, such as beams, wave packets, pulses, sequences of pulses, or other types of signals. Solid arrows in FIG. 2 indicate optical signal propagation, dashed arrows in FIG. 2 depict propagation of electronic (including radio frequency) signals. Signal laser 202 and/or LO laser 230 can be a broadband laser, a narrow-band laser, a light-emitting diode, a Gunn diode, and the like. Signal laser 202 and/or LO laser 230 can be a semiconductor laser, a gas laser, an ND:YAG laser, or any other type of a laser. Signal laser 202 and/or LO laser 230 can be a continuous wave laser, a single-pulse laser, a repetitively pulsed laser, a mode locked laser, and the like.

In some implementations, light output by the signal laser 202 (and/or LO laser 230) can be conditioned (pre-processed) by one or more components or elements of a beam preparation stage 210 (and LO beam preparation stage 232) of the optical sensing system 200 to ensure narrow-band spectrum, target linewidth, coherence, polarization (e.g., circular or linear), and other optical properties that enable coherent (e.g., Doppler) measurements described below. Beam preparation can be performed using filters (e.g., narrow-band filters), resonators (e.g., resonator cavities, crystal resonators, etc.), polarizers, feedback loops, lenses, mirrors, diffraction optical elements, and other optical devices. For example, if signal laser 202 (and/or LO laser 230) is a broadband light source, the output light can be filtered to produce a narrowband beam. In some implementations, where the signal laser 202 (and/or LO laser 230) produces light that has a desired linewidth and coherence, the light can still be additionally filtered, focused, collimated, diffracted, amplified, polarized, etc., to produce one or more beams of a desired spatial profile, spectrum, duration, frequency, polarization, repetition rate, and so on. In some implementations, signal laser 202 can produce a narrow-linewidth light with linewidth below 100 KHz.

Signal laser 202 can be an adjustable-frequency laser that is a part of an optical feedback loop (OFL). The OFL can also include a photodetector 250, radio frequency (RF) mixer 252, one or more filters 256, amplifiers (not shown), and a feedback electronics module 258 to adjust settings of signal laser 202 to achieve phase coherence and a target frequency offset with LO laser 230. For example, LO laser 230 can output a beam of light that has (fixed) frequency $F_0$. The target frequency offset of signal laser 202 can be f relative to $F_0$. Because it can be difficult to achieve exact frequency $F_0+f$ using static settings of signal laser 202, signal laser 202 can be set up to output light with frequency $F_0+f'$ with a frequency offset f' that can be close ($|f-f'| \ll f$) to the target frequency $F_0+f$ but not exactly equal to the target frequency. The target frequency $F_0+f$ can be achieved via the OFL by fine-tuning the frequency offset from f' to f and ensuring phase coherence of the outputs of signal laser 202 and LO laser 230.

In some implementations, using beam splitter 220, a first copy of the signal laser light output by beam preparation stage 210 can be input into photodetector 250, which can be a balanced photodetector, e.g., a detector containing one or more photodiodes or phototransistors, arranged in a balanced photodetection setup that is capable of determining a phase difference of the collected beam with a reference (e.g., local oscillator) beam. A balanced photodetector can have photodiodes connected in series and can generate ac electrical signals that are proportional to a difference of input optical modes (which can additionally be processed and amplified). A balanced photodetector can include photodiodes that are Si-based, InGaAs-based, Ge-based, Si-on-Ge-based, and the like (e.g. avalanche photodiode, etc.). In some implementations, balanced photodetectors can be manufactured on a single chip, e.g., using complementary metal-oxide-semiconductor (CMOS) structures, silicon photomultiplier (SiPM) devices, or similar systems. Photodetector 250 may also include metal-semiconductor-metal photodetectors, photomultipliers, photoemissive detectors, and the like. In some implementations, photodetector 250 may include solid-state photo-sensitive devices, such as SiPMs and single-photon avalanche diodes. Additionally, using beam splitter 234, a first copy of LO laser light output by LO beam preparation stage 232 can be inputted into photodetector 250. As depicted schematically, a copy of the signal beam (outputted by beam splitter 220) and a first copy of LO beam (outputted by beam splitter 234) can be combined in beam combiner 222 before being input into photodetector 250. In some implementations, beam combiner 222 outputs a single beam that is inputted into a single photodiode of photodetector 250. In some implementations, beam combiner 222 outputs more than one beam (e.g., two beams) that are inputted into separate photodiodes (which can be in a balanced configuration) of photodetector 250. Beam splitters 220 and 234 can be any device capable of spatially separating an incident light beam into two (or more) beams. For example, beam splitters 220 and 234 can be prism-based beam splitters, partially-reflecting mirrors, polarizing beam splitters, beam samplers, fiber optical couplers (e.g., optical fiber adaptors), or any similar beam splitting elements (or combination of two or more beam-splitting elements). Light beam can be delivered to (and/or from) the beam splitters 220 and 234 (as well as between any other components depicted in FIG. 2) over air or over light carriers such as optical fibers or other types of waveguide devices, which can be coherence- and polarization-preserving devices.

Prior to being inputted to photodetector 250, any one (or both) of the input signals can be additionally processed (e.g., amplified, filtered, attenuated, etc.) to have the same (or close) amplitudes. Photodetector 250 can detect a difference between frequencies and phases of the input beams, e.g., between frequency $F_0+f'$ of the signal beam and frequency $F_0$ of the LO beam. Photodetector 250 can output an electric signal (e.g., electric current) representative of the information about relative frequencies and phases of the input beams. For example, if a signal with amplitude A, e.g., $A \cos 2\pi F_0 t$, from LO laser 230 is one of the inputs into photodetector 250 and a signal $A \cos [2\pi(F_0+f')t+\phi]$, with the offset frequency f' and some phase shift $\phi$, is another input into photodetector 250, the electric signal representative of the difference of the two signals can be proportional to $$A\cos[2\pi F_0 t] - A\cos[2\pi(F_0 + f')t + \phi] = 2A\sin\left[2\pi\left(F_0 + f'/2\right)t + \phi/2\right]\sin\left[\pi f' t + \phi/2\right]$$

with the beat pattern (represented by the second sine function) sensitive to both the offset frequency f' and phase difference $\phi$.

Photodetector 250 can output the electric signal representative of the beat pattern (defined by the actual offset value f') to RF mixer 252 (additionally identified in FIG. 2 with the "TX" label to indicate that RF mixer 252 belongs to the transmission (TX) part of the optical sensing system 200). A second input into RF mixer 252 can be an RF local oscillator 254 (e.g., a synthesizer) that produces the target offset f. An output of RF mixer 252 can include a first RF signal with frequency difference f−f' between the target offset and the actual offset and a second RF signal with frequency f+f'. Both output signals and can be input into filter 256, which can be a low-pass filter having a cut-off frequency below the target offset frequency f but above a typical range of signal laser 202 frequency float. The output of filter 256 can be provided to a feedback electronics module 258. Feedback electronics module 258 can operate in a frequency range that includes a low-frequency (e.g., dc and close to dc) domain but also extends above at least the linewidth of the beam output by signal laser 202. In some implementations, the bandwidth at which feedback electronics module 258 operates can be significantly higher than the linewidth of signal laser 202, to improve line narrowing (or to prevent line broadening) during loop locking operations. For example, the bandwidth can be 1-10 MHz or even more (e.g., for the signal laser linewidth of 50-100 KHz). In some implementations, the bandwidth can be up to 50 MHz. Increasing the bandwidth can be cost-optimized against desired accuracy of the sensing system, with higher bandwidths acceptable in higher-accuracy sensing systems and lower bandwidths used in more economical devices that have a lower target accuracy.

Feedback electronics module 258 can determine the frequency of the input signal, f−f' (or the absolute value of |f−f'|) and change settings of signal laser 202 to minimize f−f'. For example, feedback electronics module 258 can determine—by adjusting settings of signal laser 202 and detecting a corresponding change in the frequency of the output of filter 256—that increasing (decreasing) frequency of signal laser 202 reduces (enhances) the frequency mismatch |f−f'| whereas decreasing (increasing) frequency of signal laser 202 enhances (reduces) the frequency mismatch |f−f'|. Feedback electronics module 258 can then change the settings of signal laser 202, e.g., move frequency f in the direction that decreases the frequency mismatch |f−f'|. This procedure can be repeated iteratively (e.g., continuously or quasi-continuously) until the mismatch |f−f'| is minimized and/or brought within an acceptable (e.g., target) accuracy.

Similarly to how the frequency difference is minimized, RF mixer 252, RF LO (TX) 254, and feedback electronics module 258 can be used to correct for the phase difference $\phi$ between the signals output by signal laser 202 and LO laser 230. In some implementations, filter 256 can filter out high frequency phase fluctuations while selecting, for processing by feedback electronics module 258, those fluctuations whose frequency is of the order of (or higher, up to a certain predefined range, than) the linewidth of signal laser 202. For example, the linewidth can be below 50-100 KHz whereas filter 256 bandwidth can be of the order of 1 MHz.

The OFL can include additional elements that are not explicitly depicted in FIG. 2. For example, the OFL can include one or more electronic amplifiers, which can amplify outputs of at least some of: photodetector 250, RF mixer 252, filter 256, and so on. In some implementations, feedback electronics module 258 can include an analog-to-digital converter (ADC) with some components of feedback electronics module 258 implemented as digital processing components. Feedback electronics module 258 can include circuitry capable of adjusting various settings of signal laser 202, such as parameters of optical elements (mirrors, diffraction gratings), including grating periods, angles, refractive indices, lengths of optical paths, relative orientations of optical elements, and the like. Feedback electronics module 258 can be capable of tuning the amount of current injected into elements of signal laser 202 to control temperature, charge carrier density, and other parameters responsible for control of the frequency and phase of light output by signal laser 202.

After synchronization by the OFL has been achieved, signal laser 202 operates in a mode that is frequency-offset and phase-locked relative to LO laser 230. A second copy (output by beam splitter 220) of the signal laser beam can be transmitted to a target, which can be an object 265 in the driving environment 110. The second copy of the light beam can be amplified by optical amplifier 240 (which can be a coherent amplifier) and delivered to a transmission (TX) optical interface 260. TX optical interface 260 can output a transmitted beam 262 as part of the scanning of the driving environment 110. TX optical interface 260 can be an aperture, an optical element, or a combination of optical elements, e.g., apertures, lenses, mirrors, collimators, polarizers, waveguides, and the like. Optical elements of TX optical interface 260 can be used to direct transmitted beam 262 to a desired region in the driving environment.

Transmitted beam 262 can travel to object 265 and, upon interaction with the surface of object 265, generate reflected beam 266 that can enter the optical sensing system 200 via a receiving (RX) optical interface 268. Because object 265 can be traveling with some velocity V>0 (towards the optical sensing system 200) or V<0 (away from the optical sensing system 200), reflected beam 266 can have a Doppler-shifted frequency $F_0+f+f_D$, with the Doppler shift $f_D$ representative of the velocity of object 265 (or the velocity of the reflecting surface of object 265), $f_D=2F_0V/c$, where c is the speed of light.

In some implementations, RX optical interface 268 can share at least some optical elements with TX optical interface 260, e.g., apertures, lenses, mirrors, collimators, polarizers, waveguides, and so on. In such implementations, a combined TX/RX optical interface 260/268 can be equipped with one or more beam splitters, optical circulators, or other devices capable of separating reflected beams and directing the separated reflected beams to one or more coherent light analyzers, such as one or more photodetectors 270 (e.g., balanced photodetector), in one implementation. The one or more photodetectors 270 can be implemented in any of the ways described above in conjunction with photodetectors 250.

Photodetector 270 can further receive a second copy of LO beam (with frequency $F_0$) from beam splitter 234. As depicted schematically, one or more reflected beams and the second copy of LO beam can be combined in beam combiner 269 before being input into photodetector 270. In some implementations, beam combiner 269 outputs a single beam that is inputted into a photodiode of photodetector 270. In some implementations, beam combiner 269 outputs more than one beam (e.g., two beams) that are inputted into separate photodiodes (which can be in a balanced configuration) of photodetector 270.

Photodetector 270 can detect phase and frequency differences between input beams, e.g., difference between frequency $F_0+f+f_D$ of reflected beam 266 and frequency $F_0$ of the LO beam. Photodetector 270 can output an electric signal (e.g., electric current) representative of the relative frequencies (and phases) of the input beams. For example, photodetector 270 can generate an electric signal representative of the beat pattern with frequency difference $f+f_D$ of the two signals and output the generated signal to RF mixer 272 (additionally identified with "RX" label to indicate that RF mixer 272 belongs to the reflection (RX) part of the optical sensing system 200). A second input into RF mixer 272 can be an RF local oscillator 274 that produces target offset f. In some implementations, RF LO (RX) 274 can be the same device as RF LO (TX) 254. An output of RF mixer 272 can include a first RF signal with the difference of the frequencies $f_D$ and a second RF signal with the sum of the frequencies, $2f+f_D$. The outputted signals can be filtered by filter 276, e.g., a low-pass filter having a cut-off below frequency f but above a typical range of Doppler shifts $f_D$. The output of filter 276 representative of Doppler shift $f_D=2F_0V/c$ can be provided (optionally, after amplification) to ADC 280 for digitization and further to digital processing module 290. Digital processing module 290 can include spectral analyzers, such as Fast Fourier Transform (FTT) analyzers to determine the Doppler shift and velocity V of object 265. Additionally, digital processing module 290 can determine a distance to object 265, e.g., by identifying a time delay between transmitted beam 262 and reflected beam 266. The time delay can be determined based on frequency modulation signatures (e.g., a sequence of chirps) or phase modulation signatures (e.g., a sequence of phase shifts) imparted to the laser beam produced by signal laser 202. In some implementations, the frequency or phase modulation (herein referred to, collectively, as angular modulation) can be imparted by an acousto-optic modulator or an electro-optic modulator (not shown in FIG. 2) applied after the OFL (e.g., prior to amplification by amplifier 240), e.g.,by an optical modulator placed between beam splitter 220 and amplifier 240 (not shown in FIG. 2 for conciseness). In some implementations, angular modulation can be added to the signal laser beam via RF LO (TX) 254 of the optical feedback loop. As a result, operations of RF mixer (TX) 252 and feedback electronics module 258 amount to passing the angular modulation imparted by RF LO (TX) 254 to the signal laser beam. In some implementations, the angular modulation can be imparted to both the signal laser beam and the LO laser beam. Digital processing module 290 can identify the time delay based on a phase difference between the reflected beam and the LO laser beam, e.g., by determining a time shift of the angular modulation of the reflected beam relative to the LO copy of the transmitted beam.

In some implementations, RF LO (RX) 274 can be configured to output frequency $f+f_{RF}$ that is different from offset frequency f. In such implementations, low frequency output of RX mixer 272 can have frequency $f_{RF}-f_D$. Accordingly, output frequencies that are larger than $f_{RF}$ can indicate a negative velocity of object 265 whereas output frequencies that are smaller output than frequency $f_{RF}$ can indicate a positive velocity of object 265.

Figure 3:
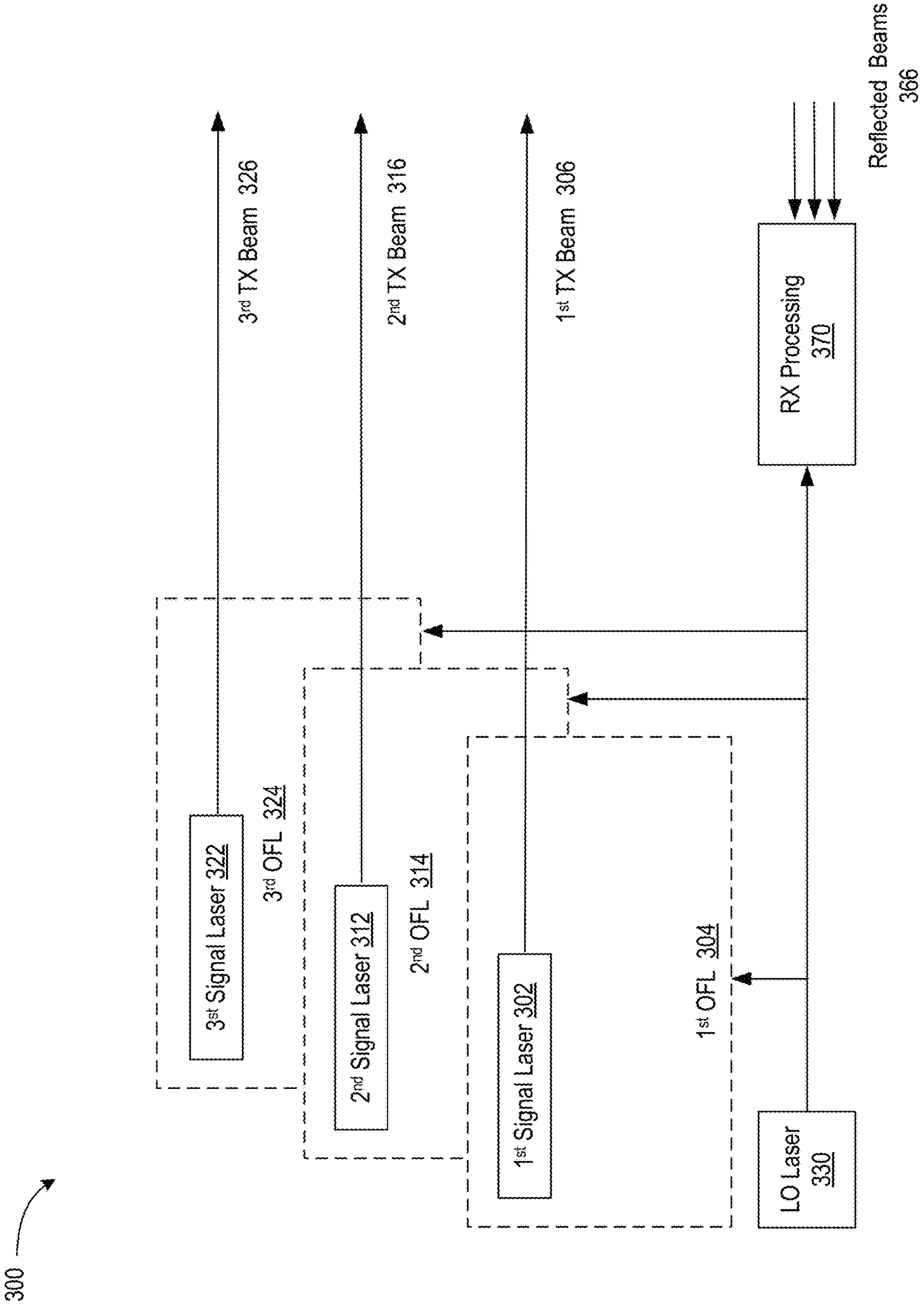
FIG. 3 is a block diagram illustrating an example implementation of a cascade optical sensing system that uses optical locking to enable channel multiplexing for range and velocity detection, in accordance with some aspects of the present disclosure.
Figure 4:
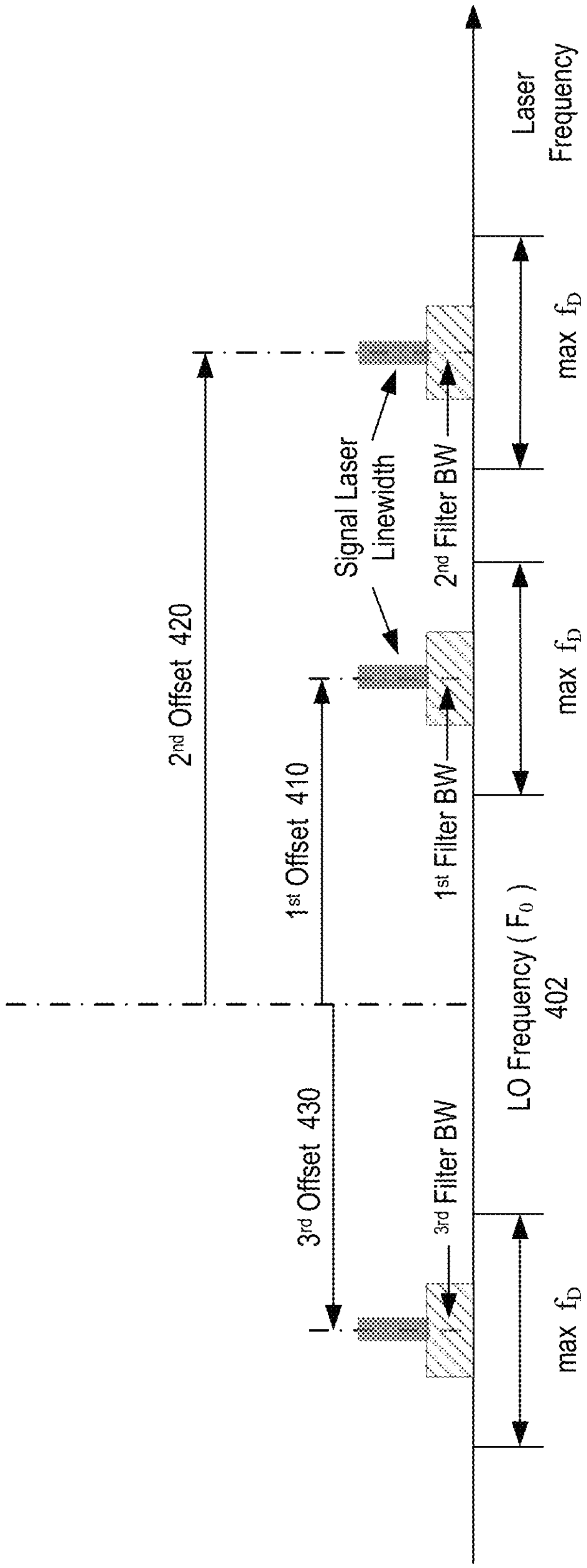
FIG. 4 depicts schematically frequency offsets that can be used in a cascade optical sensing system that utilizes optical locking to enable channel multiplexing, in accordance with some aspects of the present disclosure.

Implementations disclosed above enable cascade channel multiplexing using multiple optical feedback loops. FIG. 3 is a block diagram illustrating an example implementation of a cascade optical sensing system 300 (e.g., as part of coherent lidar sensor 124) that uses optical locking to enable channel multiplexing for range and velocity detection, in accordance with some aspects of the present disclosure. Depicted in FIG. 3 are multiple sources of light, e.g., first signal laser 302, second signal laser 312, third signal laser 322. Although only three signal lasers are depicted for conciseness, any number of signal lasers can be implemented. FIG. 3 also depicts an LO laser 330. LO laser 330 can be configured to output a beam with fixed frequency $F_0$. Each signal laser can be configured to output light of frequency that is offset differently from other output light. For example, a j-th transmitted beam (e.g., first TX beam 306, second TX beam 316, third TX beam 326, and so on) can be configured to have frequency $F_0+f_j$ that is shifted from frequency $F_0$ by j-th frequency offset $f_j$. FIG. 4 depicts schematically frequency offsets that can be used in a cascade optical sensing system that utilizes optical locking to enable channel multiplexing, in accordance with some aspects of the present disclosure. Depicted are a first frequency offset $f_1$ 410, a second frequency offset $f_2$ 420, and a third frequency offset $f_3$ 430 counted from LO frequency 402. FIG. 4 also shows schematically (not to scale) bandwidths (BWs) of various OFL filters (e.g., filters 256) and signal laser linewidths. As shown, signal laser linewidths (e.g., 50 KHz or less) can be narrower than filter bandwidths (e.g., about 1 MHz), which in turn can be less than the offsets (e.g., 150-200 MHz).

With reference to FIG. 3, each signal laser can be phase and frequency locked to LO laser 330 using multiple optical feedback loops (OFL) (as described in more detail in conjunction with FIG. 2 above), e.g., a first OFL 304 can be used to lock first signal laser 302, a second OFL 314 can be used to lock second signal laser 312, a third OFL 324 can be used to lock third signal laser 322, and so on. For reliable resolution of different received beams reflected from various objects of the driving environment, spacing between frequency offsets can be made larger than the maximum Doppler shift frequency expected to be generated by moving objects in the environment, e.g., $|f_j-f_k|>f_D$ for any j and k ($f_k$ being k-th frequency offset). For Doppler shifts encountered in automotive environments, typical Doppler shifts are of the order $f_D$~70 MHz. Accordingly, first signal laser 302 having offset $f_1$=200 MHz can have a working range extending (approximately) from 130 MHz to 270 MHz while second signal laser 312 having offset $f_2$=400 MHz can have a working range extending (approximately) from 330 MHz to 470 MHz, and so on. In some implementations, where strong light signals are being used, to prevent nonlinear intermodulation, even larger spacings of frequency offsets can be deployed.

Because working ranges of each signal lasers are non-overlapping, a common photodetector can be used for RX processing 370 (which can include components that are similar to components 270-290 of FIG. 2) of various reflected beams 366, simplifying the complexity of the optical sensing system. Similarly, Doppler frequency shifts for different reflected beams 366 can be determined using a common Fast Fourier Transform processing analyzing (concurrently or sequentially) different non-overlapping frequency ranges.

Figure 5:
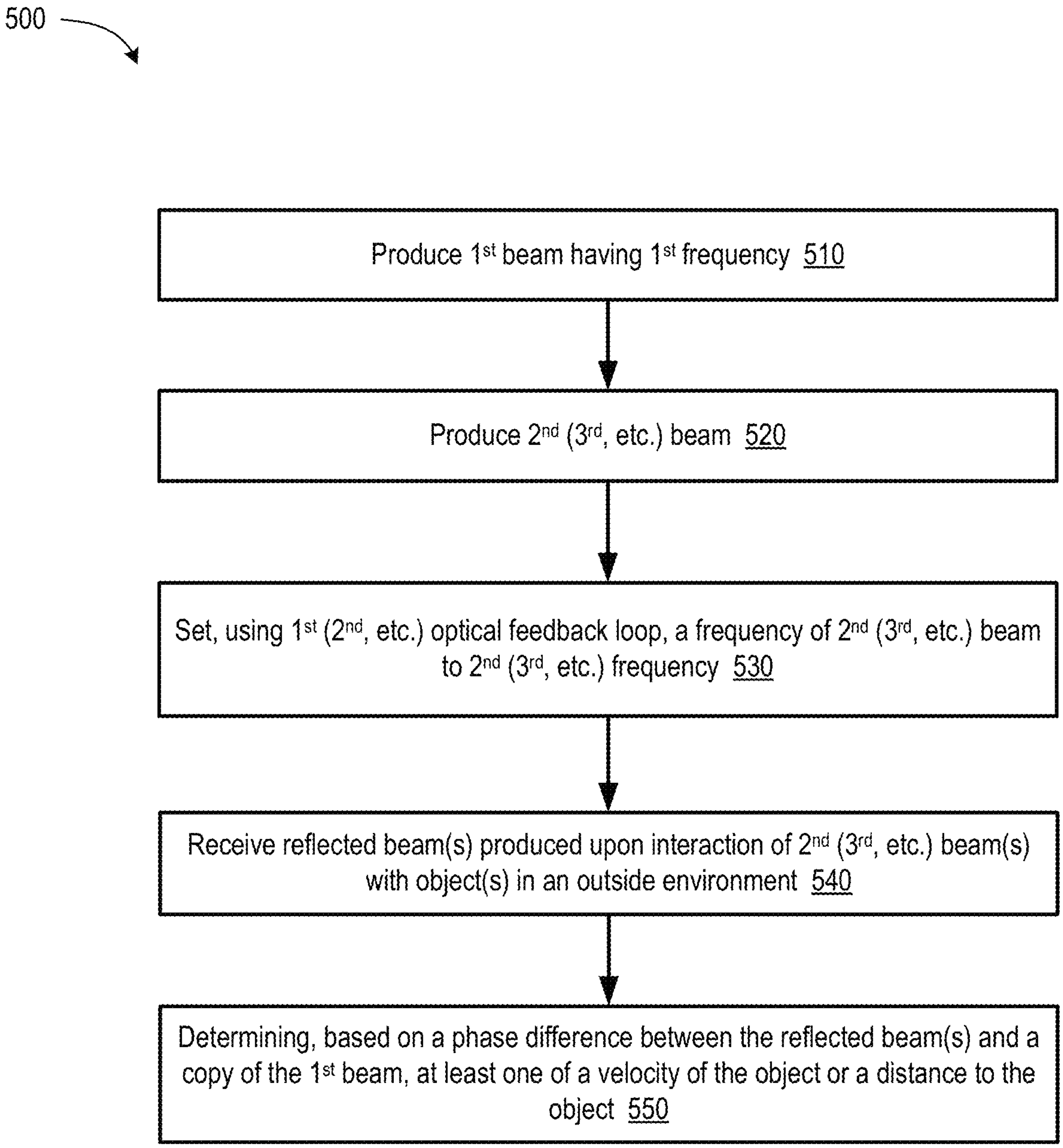
FIG. 5 depicts a flow diagram of an example method of channel multiplexing for range and velocity detection, in accordance with some implementations of the present disclosure.
Figure 6:
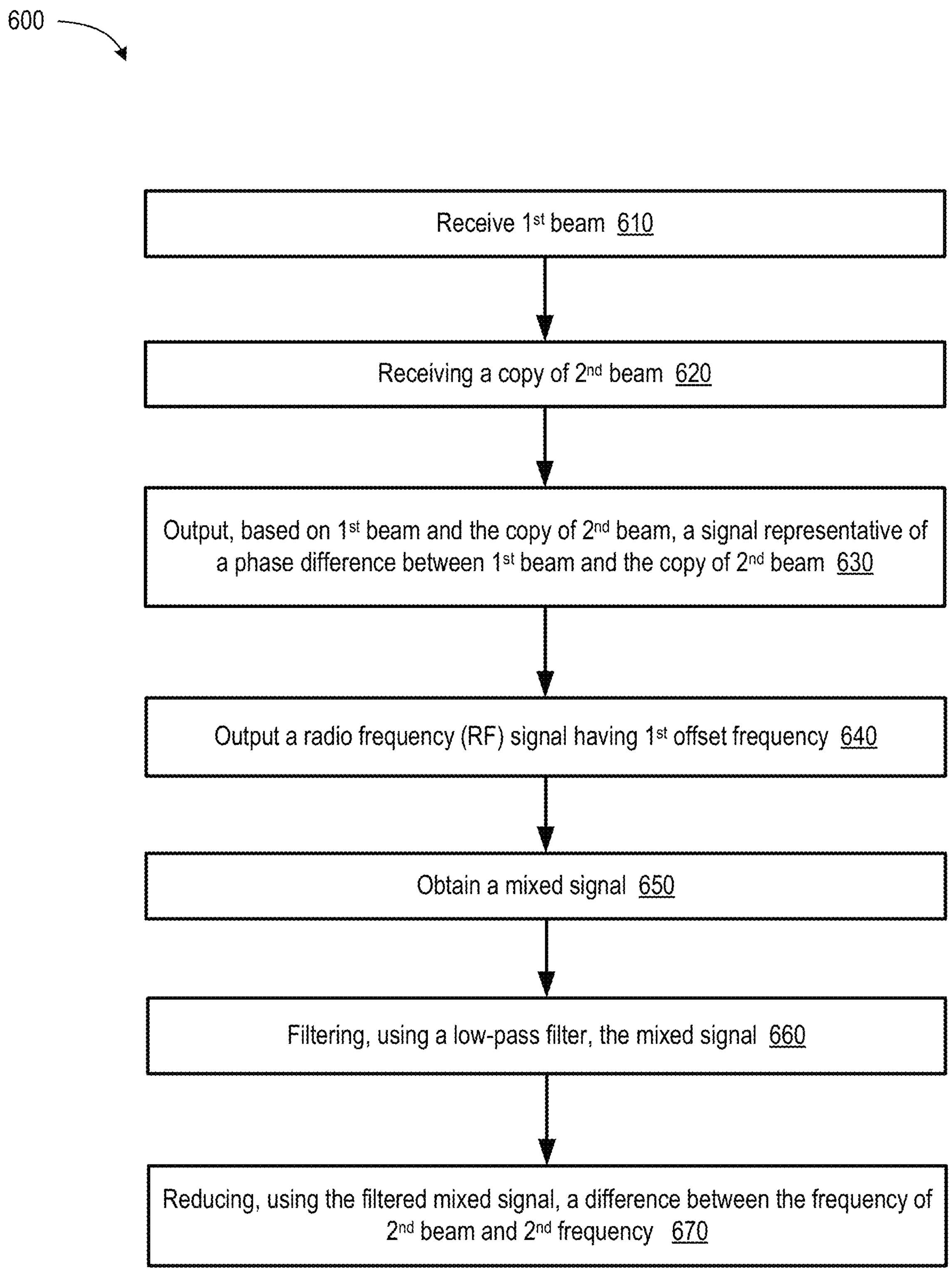
FIG. 6 depicts a flow diagram of an example method of operating an optical feedback loop to support channel multiplexing for range and velocity detection, in accordance with some implementations of the present disclosure.
Figure 7:
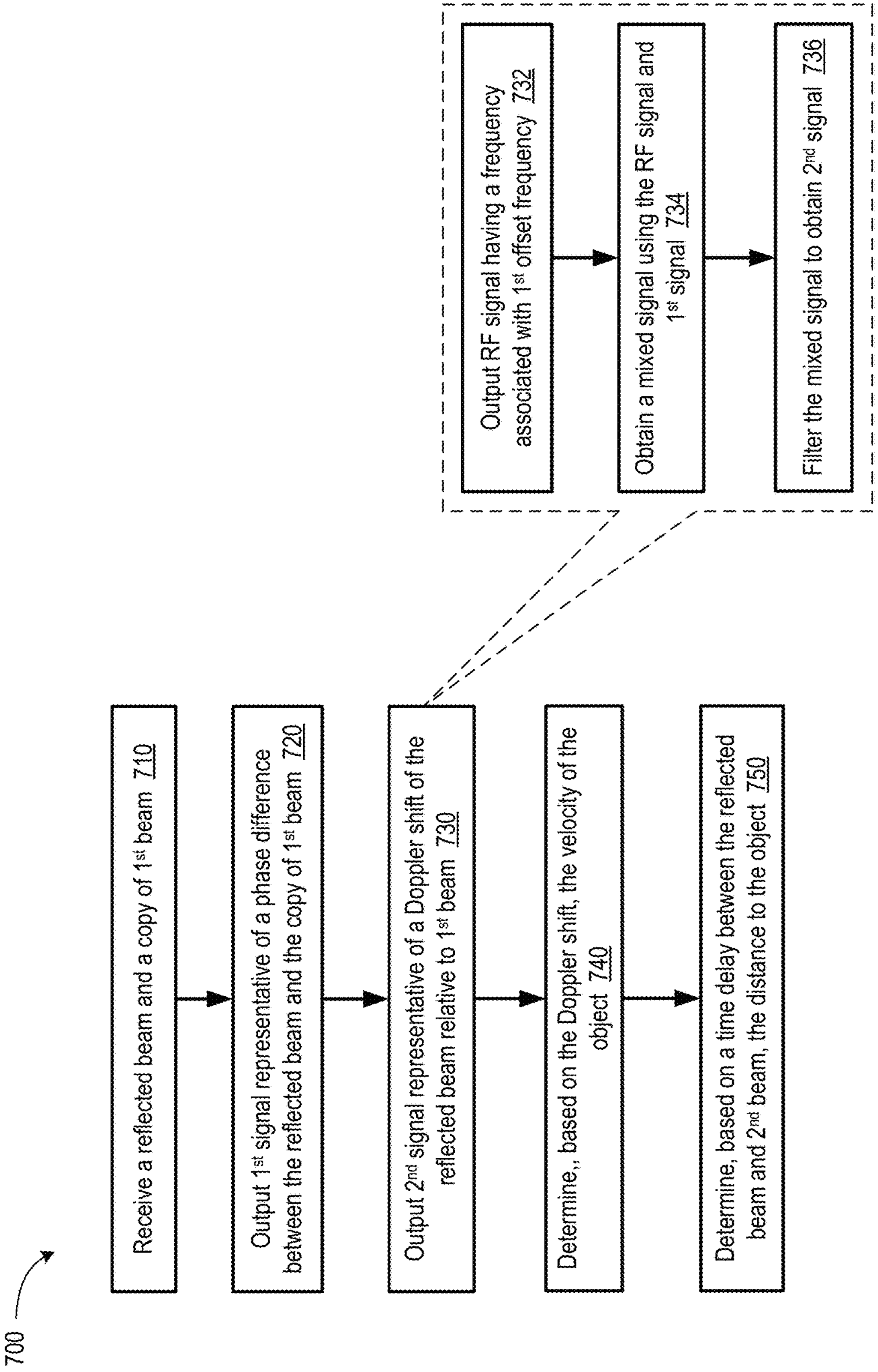
FIG. 7 depicts a flow diagram of an example method of operating an optical detection subsystem that supports channel multiplexing for range and velocity detection, in accordance with some implementations of the present disclosure

FIG. 5, FIG. 6, and FIG. 7 depict flow diagrams of example methods 500, 600, and 700 of using optical locking lidar sensors to enable channel multiplexing for range and velocity detection, in accordance with some aspects of the present disclosure. Methods 500, 600, and 700 can be performed using systems and components described in relation to FIGS. 1-4, e.g., the optical sensing system 200 of FIG. 2. Methods 500, 600, and 700 can be performed as part of obtaining range and velocity data that characterizes a driving environment of an autonomous vehicle. Various operations of methods 500, 600, and 700 can be performed in a different order compared with the order shown in FIGS. 5-7. Some operations of methods 500, 600, and 700 can be performed concurrently with other operations. Some operations can be optional. Methods 500, 600, and 700 can be used to improve speed, coverage, and efficiency of velocity and distance detections as well as to reduce the complexity and manufacturing costs of lidar devices.

FIG. 5 depicts a flow diagram of an example method 500 of channel multiplexing for range and velocity detection, in accordance with some implementations of the present disclosure. Method 500 can include producing, at block 510, using a first light source (e.g., LO laser 230 in FIG. 2) a first beam having a first frequency (e.g., frequency $F_0$). At block 520, a second light source (e.g., signal laser 202) can produce a second beam. At block 530, a first optical feedback loop can set (e.g., using optical locking) a frequency of the second beam to a second frequency (e.g., $F_0$+f). The second frequency can be different from the first frequency by a first offset frequency (e.g., f). In some implementations, the optical feedback loop can include one or more optical devices, such as beam splitters 220 and 234, beam combiner 222, one or more photodetectors 250, and the like. The optical feedback loop can also include one or more electronic circuits, such as RF mixer 252, RF local oscillator 254, one or more filters 256, feedback electronics module 258 coupled to signal laser 202, and other suitable elements (including but not limited to amplifiers, polarizers, and the like). In some implementations, the optical feedback loop can perform operations described below in conjunction with method 600 of FIG. 6.

At block 540, method 500 can continue with an optical detection subsystem receiving a reflected beam (e.g., reflected beam 266) produced upon interaction of the second beam (e.g., transmitted beam 262 output through TX optical interface 260) with an object (e.g., object 265) in an outside environment. The outside environment can be (but need not be limited to) a driving environment of the AV. At block 550, method 500 can include determining, based on a phase difference between the reflected beam and a copy of the first beam, at least one of a velocity of the object or a distance to the object. In some implementations, the optical detection subsystem can include RX optical interface 268, beam combiner 269, one or more photodetectors 270, RF mixer 272, RF local oscillator 274, one or more filters 276, ADC 280, digital processing module 290, and other suitable elements (e.g., amplifiers). In some implementations, TX optical interface 260 and RX optical interface 268 can be combined into a common optical interface with one or more optical elements (e.g., optical circulators) configured to separate the transmitted beam from the reflected beam. In some implementations, the optical feedback loop can perform operations described below in conjunction with method 700 of FIG. 7.

In some implementations, operations of blocks 520-550 can be performed for multiple signal lasers, e.g., using multiple feedback loops. Corresponding multiple transmitted beams can be used to detect velocity and distance of multiple objects in the environment of the AV. More specifically, a third (fourth, etc.) light source can be used to produce a third (fourth, etc.) beam and a second (third, etc.) optical feedback loop can be used to set (e.g., lock) a frequency of the third (fourth, etc.) beam to a third (fourth, etc.) frequency. The third (fourth, etc.) frequency can be different from the first frequency by a second (third, etc.) offset frequency.

FIG. 6 depicts a flow diagram of an example method 600 of operating an optical feedback loop to support channel multiplexing for range and velocity detection, in accordance with some implementations of the present disclosure. Method 600 can include receiving, by a photodetector (e.g., photodetector 250), the first beam (e.g., from beam splitter 234) and a copy of the second beam (e.g., from beam splitter 220). At block 630, method 600 can continue with the photodetector outputting a signal representative of a phase difference between the first beam and the copy of the second beam. At block 640, method 600 can include using a local oscillator (e.g., RF LO 254) to output an RF signal having the first offset frequency (e.g., f). At block 650, method 600 can continue with an RF mixer (e.g., RF mixer 252) obtaining a mixed signal using the RF signal (e.g., provided by the RF LO 254) and the signal representative of the phase difference between the first beam and the copy of the second beam (e.g., provided by photodetector 250). At block 660, a low-pass filter (e.g., filter 256) can filter the mixed signal. In some implementations, a bandwidth of the low-pass filter can be larger than a linewidth of the first beam and smaller than the first offset frequency. At block 670, method 600 can continue with a feedback electronics module (e.g., feedback electronics module 258) reducing, using the mixed signal, a difference between the frequency of the second beam and the second frequency. More specifically, if the frequency of the second beam is $F_0$+f', the feedback electronics module can adjust the second beam (using a signal of frequency f−f') to bring the frequency of the second beam to (or near) $F_0$+f. This adjustment can be performed iteratively and/or continuously, to compensate for run-time deviations of the frequency of the second beam from the target frequency $F_0$+f.

FIG. 7 depicts a flow diagram of an example method 700 of operating an optical detection subsystem that supports channel multiplexing for range and velocity detection, in accordance with some implementations of the present disclosure. At block 710, method 700 can include receiving a reflected beam (e.g., through RX optical interface 268 or a combined TX/RX optical interface) by a photodetector (e.g., photodetector 270). The reflected beam may be Doppler-shifted (e.g., by $f_D$) relative to the second beam (e.g., the reflected beam can have frequency $F_0+f+f_D$). The photodetector can further receive a copy of the first beam (e.g., a copy of the LO beam). Method 700 can continue, at block 720, with the photodetector outputting a first signal representative of a phase difference between the reflected beam and the copy of the first beam. For example, the outputted first signal can have frequency $f+f_D$.

At block 730, method 700 can continue with an analog circuit (which can include one or more of RF mixer 272, RF LO 274, filter 276, and other elements) outputting, based on the first signal, a second signal representative of a Doppler shift (e.g., $f_D$) of the reflected beam relative to the second beam. The second signal can have frequency $f_{RF}-f_D$. In some implementations, the analog circuit can include one or more devices, including an RF mixer (e.g., RF mixer 272), an RF local oscillator (e.g., RF LO 274), a filter (e.g., filter 276), and other elements. In some implementations, as depicted with the callout section of FIG. 7, operations of the analog circuit can include outputting, by the local oscillator (e.g., RF LO 274), a radio frequency (RF) signal having a frequency that is associated with the first offset frequency. In some implementations, the RF signal can be shifted from the first offset frequency f by $f_{RF}$ (e.g., $f+f_{RF}$). At block 734, operations of the analog circuit can include obtaining, by the RF mixer (e.g., RF mixer 272), a mixed signal using the RF signal and the first signal. The mixed signal can have multiple frequencies, e.g., $f_{RF}-f_D$ and $2f+f_{RF}+f_D$, e.g., frequencies that correspond to the difference and the sum of the frequencies of the RF signal (e.g., $f+f_{RF}$) and the first signal (e.g., $f+f_D$). At block 736, the operations of the analog circuit can include filtering, by the filter (e.g., filter 276), the mixed signal to obtain the second signal. More specifically, the filter can filter out a part of the mixed signal of frequency $2f+f_{RF}+f_D$ and maintain a part of the mixed signal of frequency $f_{RF}-f_D$ (representative of the Doppler shift $f_D$ of the reflected beam).

At block 740, method 700 can continue with a digital circuit (e.g., digital processing module 290) determining, based on the Doppler shift, the velocity of the object. In some implementations, an ADC (e.g., ADC 280) can first digitize the second signal and provide the digitized second signal to the digital circuit, which can identify the Doppler shift $f_D$ and the velocity of the object. At block 750, method 700 can further include determining, using the digital circuit, the distance to the target. The distance to the target can be determined based on a time delay between the reflected beam and the second beam, the time delay being identified from the second signal (e.g., as a phase shift of the reflected beam relative to the transmitted beam).

In those implementations, where multiple beams are transmitted (with different frequency offsets) and multiple reflected beams are received (e.g., from multiple targets), the techniques described above allow identification of velocities of multiple targets and distances to these multiple targets.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying," "determining," "storing," "adjusting," "causing," "returning," "comparing," "creating," "stopping," "loading," "copying," "throwing," "replacing," "performing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the present disclosure also relate to an apparatus for performing the methods described herein. This apparatus can be specially constructed for the required purposes, or it can be a general purpose computer system selectively programmed by a computer program stored in the computer system. Such a computer program can be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus. Various general purpose systems can be used with programs in accordance with the teachings herein, or it can prove convenient to construct a more specialized apparatus to perform the required method steps. The required structure for a variety of these systems will appear as set forth in the description below. In addition, the scope of the present disclosure is not limited to any particular programming language. It will be appreciated that a variety of programming languages can be used to implement the teachings of the present disclosure.

It is to be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but can be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

What is claimed is:

1. A system comprising:
- a first light source configured to produce a first beam having a first frequency;
- a plurality of second light sources configured to produce a corresponding plurality of second beams;
- a plurality of optical feedback loops (OFLs), each OFL of the plurality of OFLs configured to set, using a copy of the first beam, a frequency of a respective second beam of the plurality of second beams to a respective second frequency of a plurality of second frequencies, wherein the respective second frequency is different from the first frequency by a respective offset frequency of a plurality of offset frequencies,
- wherein each OFL of the plurality of OFLs comprises a respective local oscillator configured to output a radio frequency (RF) signal having the respective offset frequency; and
- an optical detection subsystem configured to:
  - receive one or more reflected beams, each reflected beam of the one or more reflected beams produced upon interaction of at least one of the plurality of second beams with one or more objects in an outside environment; and
  - determine, based on one or more phase differences between the one or more reflected beams and the copy of the first beam, at least one of a velocity of the one or more objects or a distance to the one or more objects.

2. The system of claim 1, wherein said each OFL further comprises:
- a photodetector configured to:
  - receive the copy of the first beam;
  - receive a copy of the respective second beam;
  - output a signal representative of a phase difference between the copy of the first beam and the copy of the respective second beam; and
- an RF mixer configured to obtain a mixed signal using the RF signal and the signal representative of the phase difference between the copy of the first beam and the copy of the respective second beam.

3. The system of claim 2, further comprising:

a feedback electronics module configured to reduce, using the mixed signal, a difference between the frequency of the respective second beam and the respective second frequency.

4. The system of claim 2, further comprising:

a low-pass filter configured to filter the mixed signal, wherein a bandwidth of the low-pass filter is larger than a linewidth of the first beam and smaller than the respective offset frequency.

5. The system of claim 1, further comprising:

an optical modulator configured to impart angular modulation to at least one second beam of the plurality of the second beams, wherein the angular modulation comprises at least one of a frequency modulation or a phase modulation, and wherein the optical detection subsystem is configured to determine the distance to the object based on a time delay between the reflected beam and the second beam, the time delay determined based on the phase difference between the reflected beam and the copy of the first beam.

6. The system of claim 1, wherein the optical detection subsystem comprises:

a photodetector configured to:

receive the one or more reflected beams, wherein the one or more reflected beams are Doppler-shifted relative to at least one second beam of the plurality of the second beams;

receive the copy of the first beam; and output a first signal representative of a phase difference between the one or more reflected beams and the copy of the first beam.

7. The system of claim 6, wherein the optical detection subsystem further comprises:

an analog circuit configured to output, based on the first signal, a second signal representative of at least one Doppler shift of the one or more reflected beams relative to at least one second beam of the plurality of second beams; and a digital circuit configured to determine, based on the at least one Doppler shift, the velocity of the object.

8. The system of claim 7, wherein the analog circuit comprises:

a plurality of local oscillators configured to output a corresponding plurality of radio frequency (RF) signals each having a frequency that is associated with a corresponding offset frequency of the plurality of offset frequencies;

an RF mixer configured to obtain a mixed signal using the plurality of RF signals and the first signal; and a filter configured to filter the mixed signal to obtain the second signal.

9. The system of claim 1, wherein at least two second beams of the plurality of second beams are transmitted along different directions.

10. A sensing system of an autonomous vehicle (AV), comprising:

a first light source configured to produce a first beam having a first frequency;

a second light source configured to produce a second beam;

a first optical feedback loop configured to lock, using a copy of the first beam, a frequency of the second beam to a second frequency different from the first frequency by a first offset frequency;

a third light source configured to produce a third beam;

a second optical feedback loop configured to lock a frequency of the third beam to a third frequency, wherein the third frequency is different from the first frequency by a second offset frequency;

an optical interface configured to output the second beam and the third beam to a driving environment of the AV; and an optical detection subsystem configured to:

receive a first reflected beam, wherein the first reflected beam is produced upon interaction of the second beam with a first object in the driving environment of the AV, and wherein the first reflected beam is time-delayed and Doppler-shifted relative to the second beam;

determine, based on a first time delay and a first Doppler shift of the first reflected beam relative to the second beam, a velocity of the first object and a distance to the first object;

receive a second reflected beam, wherein the second reflected beam is produced upon interaction of the third beam with a second object in the driving environment of the AV, and wherein the second reflected beam is time-delayed and Doppler-shifted relative to the third beam; and determine, based on a second time delay and a second Doppler shift of the second reflected beam relative to the third beam, a velocity of the second object and a distance to the second object.

11. The sensing system of claim 10, wherein the first optical feedback loop comprises:

a first balanced photodetector configured to:

output a first signal representative of a frequency difference between the first beam and the second beam; and one or more electronic circuits coupled to the second light source and configured to:

reduce, using the first signal, a difference between the frequency of the second beam and the second frequency.

12. The sensing system of claim 11, wherein the first signal is further representative of a phase difference between the first beam and the second beam, and wherein the one or more electronic circuits are further configured to:

modify, using the first signal, the phase difference between the first beam and the second beam.

13. The sensing system of claim 11, wherein the second optical feedback loop comprises a second balanced photodetector, and wherein the one or more electronic circuits are further coupled to the third light source;

wherein the second balanced photodetector is configured to:

output a second signal representative of a frequency difference between the first beam and the third beam; and wherein the one or more electronic circuits is configured to:

reduce, using the second signal, a difference between the frequency of the third beam and the third frequency.

14. A method comprising:

producing a first beam having a first frequency;

producing a second beam and a third beam;

outputting, by a first local oscillator of a first optical feedback loop (OFL), a first radio frequency (RF) signal having a first offset frequency;

locking, using the first OFL, the first RF signal, and a copy of the first beam, a frequency of the second beam to a second frequency different from the first frequency by a first offset frequency set by the first OFL;

outputting, by a second local oscillator of a second OFL, a second RF signal having a second offset frequency;

locking, using the second OFL, the second RF signal, and the copy of the first beam, a frequency of the third beam to a third frequency different from the first frequency by a second offset frequency set by the second OFL;

receiving a reflected beam produced upon interaction of at least one of the second beam or the third beam with an object in an outside environment; and determining, based on a phase difference between the reflected beam and the copy of the first beam, at least one of a velocity of the object or a distance to the object.

15. The method of claim 14, wherein locking the frequency of the second beam to the second frequency comprises:

receiving the first beam;

receiving a copy of the second beam;

outputting, based on the first beam and the copy of the second beam, a signal representative of a phase difference between the first beam and the copy of the second beam;

the first RF signal having the first offset frequency; and obtaining a mixed signal using the first RF signal and the signal representative of the phase difference between the first beam and the copy of the second beam.

16. The method of claim 15, further comprising:

filtering, using a low-pass filter, the mixed signal, wherein a bandwidth of the low-pass filter is larger than a linewidth of the first beam and smaller than the first offset frequency; and reducing, using the filtered mixed signal, a difference between the frequency of the second beam and the second frequency.

17. The method of claim 14, wherein determining at least one of the velocity of the object or the distance to the object comprises:

receiving the copy of the first beam;

outputting a first signal representative of the phase difference between the reflected beam and the copy of the first beam;

outputting, based on the first signal, a second signal representative of a Doppler shift of the reflected beam relative to the second beam;

determining, based on the Doppler shift, the velocity of the object; and determining, based on a time delay between the reflected beam and the second beam, the distance to the object.

18. The method of claim 17, wherein outputting the second signal comprises:

outputting the first RF signal having the first offset frequency;

obtaining a mixed signal using the first RF signal and the first signal; and filtering the mixed signal to obtain the second signal.

19. The method of claim 14, wherein the second beam and the third beam are transmitted into the outside environment along different directions.

* * * * *